United States Patent
Jeong et al.

(10) Patent No.: US 12,503,368 B2
(45) Date of Patent: *Dec. 23, 2025

(54) METHOD FOR MANUFACTURING CONGLOMERATED GRAPHITE, THE CONGLOMERATED GRAPHITE MANUFACTURED USING THE METHOD, AND SECONDARY BATTERY INCLUDING THE CONGLOMERATED GRAPHITE AS AN ANODE ACTIVE MATERIAL

(71) Applicant: HanWool EM, Inc., Hwaseong (KR)

(72) Inventors: Young Woon Jeong, Pyeongtaek (KR); Jeong Hun Oh, Hwaseong (KR); Jin Hwan Kim, Yongin (KR)

(73) Assignee: HANWOOL EM, INC., Hwaseong-si (KR)

( * ) Notice: Subject to any disclaimer, the term of this patent is extended or adjusted under 35 U.S.C. 154(b) by 28 days.

This patent is subject to a terminal disclaimer.

(21) Appl. No.: 18/863,951

(22) PCT Filed: Sep. 29, 2022

(86) PCT No.: PCT/KR2022/014614
§ 371 (c)(1),
(2) Date: Nov. 7, 2024

(87) PCT Pub. No.: WO2023/224177
PCT Pub. Date: Nov. 23, 2023

(65) Prior Publication Data
US 2025/0109024 A1 Apr. 3, 2025

(30) Foreign Application Priority Data
May 20, 2022 (KR) .................. 10-2022-0061757

(51) Int. Cl.
*C01B 32/21* (2017.01)

(52) U.S. Cl.
CPC .......... *C01B 32/21* (2017.08); *C01P 2004/61* (2013.01); *C01P 2006/12* (2013.01);
(Continued)

(58) Field of Classification Search
CPC .. C01B 32/21; C01P 2004/61; C01P 2006/12; C01P 2006/16
See application file for complete search history.

(56) References Cited

U.S. PATENT DOCUMENTS

| | | | | |
|---|---|---|---|---|
| 4,194,901 A | * | 3/1980 | Gambacorta | .......... C21C 7/0025 75/517 |
| 11,646,406 B2 | * | 5/2023 | Yamazaki | ............. H01M 4/587 429/231.8 |

(Continued)

FOREIGN PATENT DOCUMENTS

| | | | | |
|---|---|---|---|---|
| CN | 106058211 A | | 10/2016 | |
| CN | 109970052 A | * | 7/2019 | ............. C01B 32/21 |

(Continued)

OTHER PUBLICATIONS

Machine translation of KR101426195B1, publication date Jan. 20, 2013.*
Chinese Office Action mailed on Feb. 26, 2025.

*Primary Examiner* — Jun Li
(74) *Attorney, Agent, or Firm* — You & IP, LLC (57) ABSTRACT

Provided are a method for manufacturing conglomerated graphite, the conglomerated graphite manufactured using the method, and a secondary battery including the conglomerated graphite as an anode active material. Particularly, provided are a method for producing conglomerated graphite having a small specific surface area for excellent initial efficiency and excellent high power of a secondary battery using natural graphite, the conglomerated graphite produced (Continued)

using the method, and a secondary battery including the conglomerated graphite as an anode active material.

7 Claims, 9 Drawing Sheets

(52) U.S. Cl.
CPC ...... *C01P 2006/14* (2013.01); *C01P 2006/16* (2013.01); *C01P 2006/40* (2013.01)

(56) References Cited

U.S. PATENT DOCUMENTS

| | | | | |
|---|---|---|---|---|
| 11,746,019 | B2* | 9/2023 | Jeong | ............ C01B 32/21 |
| | | | | 252/182.1 |
| 12,113,207 | B2* | 10/2024 | Jeong | ............ H01M 4/366 |
| 2004/0023115 | A1* | 2/2004 | Kato | ............ H01M 50/124 |
| | | | | 429/217 |
| 2004/0224230 | A1* | 11/2004 | Yanagida | ............ H01M 4/133 |
| | | | | 429/330 |
| 2012/0315213 | A1* | 12/2012 | Minoura | ............ C04B 35/6261 |
| | | | | 423/448 |
| 2017/0187041 | A1* | 6/2017 | Yamada | ............ H01M 4/583 |
| 2020/0290880 | A1* | 9/2020 | Rohde | ............ B03C 1/01 |
| 2021/0020906 | A1* | 1/2021 | Yamazaki | ............ C01B 32/205 |
| 2023/0192498 | A1* | 6/2023 | Jeong | ............ C01B 32/21 |
| | | | | 252/182.1 |
| 2023/0286806 | A1* | 9/2023 | Yamaji | ............ H01M 4/36 |
| 2023/0303396 | A1* | 9/2023 | Li | ............ H01M 4/587 |
| 2024/0266503 | A1* | 8/2024 | Jeong | ............ C04B 35/62675 |

FOREIGN PATENT DOCUMENTS

| | | | | |
|---|---|---|---|---|
| CN | 111492515 | A | | 8/2020 |
| CN | 111668480 | A * | 9/2020 | ........ H01M 10/0525 |
| CN | 114956069 | A * | 8/2022 | ........ C01B 32/205 |
| CN | 115000389 | A * | 9/2022 | ........ H01M 10/0525 |
| EP | 3 246 974 | A1 | | 11/2017 |
| JP | 2004-179015 | A | | 6/2004 |
| JP | 2013-001576 | A | | 1/2013 |
| KR | 10-2007-0073258 | A | | 7/2007 |
| KR | 10-2014-0085767 | A | | 7/2014 |
| KR | 10-1426195 | B1 | | 8/2014 |
| KR | 10-2019-0054045 | A | | 5/2019 |
| KR | 10-2021-0040810 | A | | 4/2021 |
| KR | 10-2254549 | B1 | | 5/2021 |
| KR | 10-2022-0026610 | A | | 3/2022 |
| WO | WO-2021066582 | A1 * | 4/2021 | ............ C01B 32/05 |

* cited by examiner

METHOD FOR MANUFACTURING CONGLOMERATED GRAPHITE, THE CONGLOMERATED GRAPHITE MANUFACTURED USING THE METHOD, AND SECONDARY BATTERY INCLUDING THE CONGLOMERATED GRAPHITE AS AN ANODE ACTIVE MATERIAL

TECHNICAL FIELD

The present invention relates to a novel method for manufacturing conglomerated graphite, the conglomerated graphite manufactured using the method, and a secondary battery including the conglomerated graphite as an anode active material. Particularly, the present invention relates to a new method for producing conglomerated graphite having high initial efficiency, excellent high power characteristics, and a small specific surface area as an anode active material for a secondary battery using natural graphite as a raw material, the conglomerated graphite produced using the method, and a secondary battery including the conglomerated graphite as an anode active material.

BACKGROUND ART

With the recent growths of notebook-type personal computers, portable devices such as mobile phones based on 5G communication, hybrid vehicles (HEVs), and electric vehicles (EVs), the demand for batteries is rapidly increasing In particular, high-power power sources are essential for hybrid vehicles (HEVs) and electric vehicles (EVs), and thus the need for batteries with high-power characteristics and excellent charging/discharging rate is increasing.

The battery required in this situation is a lithium ion secondary battery. In order to achieve high performance of such lithium secondary batteries, carbonaceous materials such as graphite are used for the anode active material of the battery.

Natural graphite and/or artificial graphite can be used as graphite which is a carbonaceous material used for the anode active material of the secondary battery.

Meanwhile, graphite which is a carbonaceous material used for the anode active material of the secondary battery is advantageous to have a spheroidal form for the charging/discharging efficiency of the battery, and more preferably, is advantageous to have a crystalline spheroidal form. Various methods for manufacturing spheroidal graphite used for the anode active material of the secondary battery are known.

In the manufacture of the spheroidal graphite, natural graphite of a flaky (plate) form has the disadvantage that the capacity decreases during a repeated battery charging/discharging process due to increased stress and defects inside graphite particles caused by a milling process used in spheroidizing processing, and thereby the life characteristic is deteriorated. Also, there is the disadvantage that a lot of natural graphite is discarded in the spheroidizing processing of the plate-formed natural graphite.

In addition, as one of methods for manufacturing spheroidal graphite, a method has been proposed in which artificial graphite, such as coke, is coated with a binder material of pitch and carbonized to form a carbonaceous layer on its surface, and then spheroidal graphite is produced through a final graphitization heat treatment (Patent Document 1).

However, in this method for producing spheroidal graphite, there is a problem in that the shapes of spheroidal graphite particles are not uniform depending on particulation processing, so that high efficiency (high-rate charging/discharging) based on the charging/discharging rate is not sufficiently secured.

RELATED ART DOCUMENTS

Patent Documents (Patent Document 1) Patent Document 1: Korean Patent Publication No. 2019-0054045

SUMMARY OF INVENTION

Technical Problem

One object of the present invention is to provide a method for manufacturing conglomerated graphite for use as an anode active material, which is low-cost, has properties equivalent to those of artificial graphite, and has excellent initial discharge capacity, initial efficiency and high power characteristics of a battery, by using natural graphite discarded during the spheroidizing processing of flaky graphite.

Another object of the present invention is to provide conglomerated graphite for use as an anode active material, which has excellent initial discharge capacity and initial efficiency.

Still another object of the present invention is to provide a method for manufacturing conglomerated graphite by using natural graphite to have a uniform particle size with a specific surface area of 2.0 $m^2/g$ or less of crystalline particles after crystallization of the conglomerated graphite and to have excellent crystallinity with a d002 (graphite interlayer distance) of 3.36 Å or less representing the degree of crystallinity of the conglomerated graphite particles after crystallization, and the conglomerated graphite obtained by the manufacturing method.

Solution to Problem

In order to accomplish the above objects, a novel method for manufacturing conglomerated graphite of the present invention includes:

(a) a step of pulverizing flaky natural graphite and pitch, respectively ('natural graphite and pitch pulverization step');

(b) a step of forming a conglomerated precursor by mixing a binder with the pulverized natural graphite of the step (a) ('conglomerated precursor forming step');

(c) a step of preparing a conglomerated graphite composite by mixing the pulverized pitch of the step (a) and a solvent with the conglomerated precursor formed in the step (b) ('conglomerated graphite composite preparing step');

(d) a step of first heat-treating the conglomerated graphite composite of the step (c) at 800° C. to 1100° C. ('first heat-treatment step');

(e) a step of obtaining conglomerated graphite by performing a second heat-treatment at a temperature of 2,100° C. to 2,700° C. after the first heat-treatment of the step (d) ('second heat-treatment step'); and (f) a step of obtaining final conglomerated graphite particles by classifying the conglomerated graphite obtained with the second heat-treatment of the step (e) ('classification step').

In conglomerated graphite particles obtained by the method for manufacturing the conglomerated graphite of the present invention including the steps (a) to (f) described above, the average particle size (D50) of the conglomerated graphite particles is 18 μm or less, the pore volume inside the conglomerated graphite particles is 0.006 cc/g or less, the pore size of the surface of the conglomerated graphite particles is 18.0 nm or less, the specific surface area of the conglomerated graphite particles is 2.0 m²/g or less, and d002 (graphite interlayer distance) indicating the degree of crystallinity of the conglomerated graphite particles is 3.36 Å or less.

The conglomerated graphite particles of the present invention exhibiting the characteristics described above are used as an anode active material of a secondary battery and are characterized by having excellent initial discharge capacity, initial efficiency, and high-rate charging/discharging characteristics of the secondary battery.

Advantageous Effects

The novel method for manufacturing conglomerated graphite according to the present invention can manufacture the conglomerated graphite that can be used as an anode active material having excellent crystallinity, a constant particle size, a low pore volume inside the conglomerated graphite particles, and a small pore size on the particle surface while using natural graphite as a raw material, which is known to have lower initial efficiency and life characteristics than artificial graphite when normally used as an anode active material of a battery. Due to these characteristics, when the conglomerated graphite manufactured according to the manufacturing method of the present invention is used as an anode active material of a battery, it has the advantages of excellent initial discharge capacity, initial efficiency, and high-power characteristics of the battery.

DESCRIPTION OF BEST MODE

In the following, only parts necessary for understanding embodiments of the present invention will be described, and descriptions of other parts will be omitted in the scope not disturbing the subject matter of the present invention.

The terms and words used herein should not be construed as limited to ordinary or dictionary definition, and should be construed in light of the meanings and concepts consistent with the subject matter of the present invention on the basis of the principle that the inventor can properly define his own invention as the concept of the term to describe it in the best way. It is therefore to be understood that embodiments disclosed herein are merely exemplary and various equivalents or modifications thereof are possible.

The present invention provides a method for manufacturing conglomerated graphite having an excellent crystal quality, a uniform particle size, a very small pore volume inside the particle, and a small pore size on the particle surface.

The novel method for manufacturing conglomerated graphite according to the present invention includes:

(a) a step of pulverizing flaky natural graphite and pitch, respectively ('natural graphite and pitch pulverization step');

(b) a step of forming a conglomerated precursor by mixing a binder with the pulverized natural graphite of the step (a) ('conglomerated precursor forming step');

(c) a step of preparing a conglomerated graphite composite by mixing the pulverized pitch of the step (a) and a solvent with the conglomerated precursor formed in the step (b) ('conglomerated graphite composite preparing step');

(d) a step of first heat-treating the conglomerated graphite composite of the step (c) at 800° C. to 1100° C. ('first heat-treatment step');

(e) a step of obtaining conglomerated graphite by performing a second heat-treatment at a temperature of 2,100° C. to 2,700° C. after the first heat-treatment of the step (d) ('second heat-treatment step'); and (f) a step of obtaining final conglomerated graphite particles by classifying the conglomerated graphite obtained with the second heat-treatment of the step (e) ('classification step').

Hereinafter, the steps (a) to (f) will be described in detail.

The 'natural graphite and pitch pulverization step' in the step (a) is a step of pulverizing natural graphite and pitch respectively. The 'natural graphite' which is a target of pulverization may have an average particle diameter of 5 μm to 500 μm, preferably 5 μm to 100 μm, and when the average particle diameter exceeds 500 μm, it is not economically desirable because the overall pulverization process time increases.

In addition, the 'pitch' which is a target of pulverization may have an average particle diameter of 20 mm or less, preferably 10 mm, and when the average particle diameter exceeds 20 mm, it is not economically desirable because the overall pulverization process time increases.

The pulverization of each of the 'natural graphite' and 'pitch' in the step (a) may be performed using a high-speed mechanical milling machine such as a hammer mill, a jet mill, a bead mill, or a combination thereof, preferably using the jet mill. In this case, a working pressure of the hammer mill, the jet mill, or the bead mill is a pressure required for each mill, and a pressure in case of pulverization using the jet mill is 5 bar to 10 bar, preferably 7 bar to 10 bar.

In addition, natural graphite particles are prepared to have an average particle diameter of 1 μm to 10 μm, preferably 1 μm to 5 μm through the pulverization process using the jet mill or the like from the flaky natural graphite as described above. The prepared natural graphite particles having an average particle diameter of 1 μm to 10 μm are referred to as 'pulverized natural graphite'.

Meanwhile, the pitch in the step (a) is petroleum-based pitch, coal-based pitch, or polymer resin, preferably petroleum-based pitch.

The pulverization of the pitch is performed using a high-speed mechanical milling machine such as a hammer mill, a jet mill, a bead mill, or a combined use thereof, preferably using the jet mill. In this case, a working pressure of the hammer mill, the jet mill, or the bead mill is a pressure required for each mill, and a pressure in case of pulverization using the jet mill is 5 bar to 10 bar, preferably 6 bar to 10 bar.

In addition, pitch particles are prepared to have an average particle diameter of 1 μm to 10 μm, preferably 1 μm to 5 μm through the pulverization process using the jet mill or the like from the pitch as described above. The prepared pitch particles having an average particle diameter of 1 μm to 10 μm are referred to as 'pulverized pitch'.

The 'conglomerated precursor forming step' of the step (b) is divided into:
  i) a pulverized natural graphite and binder mixing step in which a 'binder' is mixed with the 'pulverized natural graphite' of the step (a);
  ii) a step of forming the conglomerated precursor from a mixture obtained from the mixing step i); and
  iii) a step of drying the conglomerated precursor obtained from the conglomerated precursor forming step ii).

The binder in the pulverized natural graphite and binder mixing step i) may be a 'hydrocarbon oil', a 'silicon oil', a 'vegetable oil', a 'triglyceride', or a mixture thereof, preferably the 'hydrocarbon oil' or the 'silicon oil', and more preferably the 'hydrocarbon oil'.

The 'hydrocarbon oil' may include petroleum oils such as paraffin oil, Vaseline, and isoparaffins; synthetic oils such as hydrogenated polydecene, synthetic squalane, and polybutene; plant oils such as vegetable squalane and hydrogenated squalane, etc.

The preferred 'hydrocarbon oil' may be 'paraffin oil'.

In the pulverized natural graphite and binder mixing step i), the amount of the binder used is 15 parts to 25 parts by weight per 100 parts by weight of the pulverized natural graphite, and preferably 20 parts by weight.

In the mixing step i), a mixing time is the time until the mixing of the 'pulverized natural graphite' and the 'binder' is completely achieved, and may be determined depending on the amount used. A preferred mixing time is 1 hour or more.

The above mixing may be performed using a paddle mixer, which is a typical mixer in the art.

The conglomerated precursor forming step ii) is a step of putting the mixture of the mixing step i) into a conglomerating machine and then performing conglomeration processing at a linear speed of 3,500 m/min to 6,000 m/min, preferably 4,000 m/min to 5,000 m/min, for 100 seconds to 5,000 seconds, preferably 500 seconds to 3,000 seconds, and more preferably 500 seconds to 2,000 seconds.

The conglomerating machine is a rotatable device known in the art and is preferably a spheroidizing device that has blades formed on a rotor to apply friction and shear stress to the mixture during rotation. It seems that the spheroidizing of pulverized graphite occurs due to the friction and shear stress applied to the mixture.

The drying step iii) is a step of drying the conglomerated precursor obtained by the conglomeration processing of the mixture in the step ii) at 300° C. to 1000° C., preferably 400° C. to 700° C. for 30 minutes to 2 hours, preferably 1 hour to 1.5 hours. In the drying step iii), the binder mixed with the natural graphite is removed.

In the above-described step (b) of forming the conglomerated precursor, a dried conglomerated precursor is obtained through the steps of i) mixing the pulverized natural graphite and the binder; ii) forming the conglomerated precursor; and iii) drying the formed conglomerated precursor.

The 'conglomerated graphite composite preparing step' of the step (c) is a step of preparing a conglomerated graphite composite by treating the conglomerated precursor formed and dried in the step (b) with a mixed solution of the pulverized pitch of the step (a) and a solvent.

The amount of the pulverized pitch used is 25 parts to 35 parts by weight per 100 parts by weight of the pulverized natural graphite, preferably 30 parts by weight.

If the used amount of the pitch is less than 25 parts by weight, the crystallization of the completed conglomerated graphite is lowered. This may cause the anode active material manufacturing process to become unstable, such as the particles of the conglomerated graphite breaking during the pressurization process, and may also cause the initial discharge capacity and initial efficiency to be low due to the increased specific surface area (see the first and second comparative examples).

In addition, if the used amount of the pitch is more than 35 parts by weight, when the conglomerated graphite precursor is treated with a mixed solution of pitch and solvent in the conglomerated graphite precursor forming step (b), the entire precursor becomes lumpy and thereby the progress after the step (b) becomes impossible. Therefore, there is a disadvantage in that it is impossible to obtain conglomerated graphite in powder form that can be used as an anode material (see the fifth comparative example).

The solvent in the 'conglomerated graphite composite preparing step' of the step (c) is a solvent capable of dissolving the pitch, preferably an organic solvent, more preferably an ether, and even more preferably tetrahydrofuran (THF).

The used amount of the solvent is 100 parts to 400 parts by weight per 100 parts by weight of the pulverized natural graphite of the step (a), and preferably 200 parts to 300 parts by weight.

If the used amount of the solvent is less than 100 parts by weight, the surface of the dried conglomerated precursor is poorly treated due to the pulverized pitch dissolved in the solvent. As a result, the surface treatment of the natural graphite with the pitch is only partially performed. Thus, the conglomeration is not completely performed, so the manufacturing efficiency of the conglomerated graphite may decrease, and also there is a disadvantage that the performance of the obtained conglomerated graphite may decrease.

If the used amount of the solvent is more than 400 parts by weight, there is a disadvantage in that the economic feasibility of the process is reduced according to the solvent removal time.

In particular, in the case of dry processing that does not use a solvent, after the first heat-treatment step (d) is performed, the mixture of the conglomerated precursor and the pitch becomes lumpy, making it impossible to obtain conglomerated graphite in powder form that can be used as an anode material (see the sixth comparative example).

Specifically, the 'conglomerated graphite composite preparing step' of the step (c) is as follows.

First, the step is to mix the conglomerated precursor formed in the step (b) with a mixed solution of the pulverized pitch of the step (a) dissolved in a solvent and stir them in a stirrer, thereby wet-treating the surface of the conglomerated precursor formed in the step (b) with the mixed solution.

The stirring is to perform stirring and mixing by using a mixer such as a screw mixer, for example, a Nauta mixer.

The time for the stirring is a time for the dried conglomerated precursor to be sufficiently mixed in the mixed solution in which the pulverized pitch is dissolved in a solvent. This stirring time may be 30 minutes to 2 hours, but it may vary depending on the total amount.

Next, after the stirring in the stirrer is completed, drying is performed while distilling and recovering the solvent through heating at a temperature of 100° C. to 150° C. under a vacuum of 10 mbar to 100 mbar, preferably 10 mbar to 50 mbar.

The dried conglomerated graphite composite is pulverized by a pulverization process using a pin mill.

The first heat-treatment step (d) is a step of first heat-treating the pulverized conglomerated graphite composite, obtained in the step (c), at a temperature of 800° C. to 1,100° C., preferably at a temperature of 1,000° C., to obtain first heat-treated conglomerated graphite.

The first heat-treatment is performed in a nitrogen atmosphere, and an electric furnace, which is a typical heat-treatment device, may be used.

The time for the first heat-treatment is about 30 minutes to 2 hours, and may vary depending on the amount of the pulverized conglomerated graphite composite on which the first heat-treatment is performed.

The second heat-treatment step (e) is a step of secondarily heat-treating the conglomerated graphite, obtained through the first heat-treatment in the step (d), at a temperature of 2,100° C. to 2,700° C.

If the second heat-treatment temperature is lower than 2100° C., the d002 (graphite interlayer distance) exceeds 3.36 Å and thereby the initial discharge capacity and initial efficiency of the obtained conglomerated graphite decrease (see the third comparative example).

If the second heat-treatment temperature is higher than 2700° C., the second heat-treatment process requires high temperature heat and thereby the process is less economical.

Meanwhile, the second heat-treatment is a step of crystallizing amorphous carbon such as carbonized pitch and natural graphite of the conglomerated graphite formed by the first heat-treatment of the step (d), and the crystallization of the conglomerated graphite is further improved (low value of d002) by the second heat-treatment. This excellent crystallization of the conglomerated graphite is advantageous in the process of manufacturing the anode active material, and furthermore, it causes the effects of providing excellent initial discharge capacity, initial efficiency, and high-power characteristics (see the first and second embodiments).

The degree of crystallization of the conglomerated graphite that has not undergone the second heat-treatment step (e) becomes lowered (high d002 value, see the fourth comparative example), so that the manufactured conglomerated graphite has an increased irreversible capacity during initial charging/discharging, resulting in a lower initial efficiency and lower charging/discharging life characteristics. In addition, the pore volume inside the conglomerated graphite particles and the pore size on the surface of the conglomerated graphite particles increase, resulting in a disadvantage of lowering the high-power characteristics. This is disadvantageous for manufacturing the anode active material, especially for manufacturing the anode active material for batteries requiring high power (see the fourth comparative example).

The second heat-treatment is performed in an argon atmosphere, and an electric furnace, which is a typical heat-treatment device, may be used.

The second heat-treatment time is about 30 minutes to 2 hours, and may vary depending on the amount of the first heat-treated conglomerated graphite on which the second heat-treatment is performed.

The 'classification step' (f) is a step of obtaining the final conglomerated graphite anode material by classifying the conglomerated graphite obtained by the second heat-treatment step (e).

This classification is performed using a 325 Mesh sieve classifier to obtain the final conglomerated graphite having particle sizes of an average particle size (D50) of 18 μm or less.

As described above, the method for manufacturing conglomerated graphite of the present invention including the steps (a) to (f) is to produce a conglomerated precursor using flaky pulverized natural graphite and a binder, and then prepare a pulverized conglomerated graphite composite by stirring, drying, and pulverizing the surface of the conglomerated precursor with a mixed solution of pulverized pitch and a solvent (steps (a) to (c)); obtain conglomerated graphite by first heating the prepared pulverized conglomerated graphite composite (step (d)); crystallize the conglomerated graphite obtained by the first heating through a second heat-treatment (step (e)); and then classify to finally obtain conglomerated graphite having a particle size of 18 μm or less (step (f)).

In conglomerated graphite particles obtained by the method for manufacturing the conglomerated graphite of the present invention including the steps (a) to (f) described above,
 the average particle size (D50) of the conglomerated graphite particles is 18 μm or less,
 the pore volume inside the conglomerated graphite particles is 0.006 cc/g or less,
 the pore size of the surface of the conglomerated graphite particles is 18.0 nm or less, and
 the specific surface area of the conglomerated graphite particles is 2.0 m$^2$/g or less, preferably 1.4 m$^2$/g or less.

In addition to the above characteristics, d002 (graphite interlayer distance) indicating the degree of crystallinity of the conglomerated graphite particles of the present invention is 3.36 Å or less, that is, the conglomerated graphite particles have excellent crystallinity. Therefore, the particulation of the conglomerated graphite particles is maintained even under strong pressure applied during the manufacture of the anode active material, thereby exhibiting excellent initial discharge capacity (%) and initial efficiency (%) of the battery.

The conglomerated graphite particles of the present invention exhibiting the above characteristics are used as the anode active material of the secondary battery, thereby having excellent initial discharge capacity and excellent high-rate charging/discharge characteristics of the secondary battery.

Figure 1:
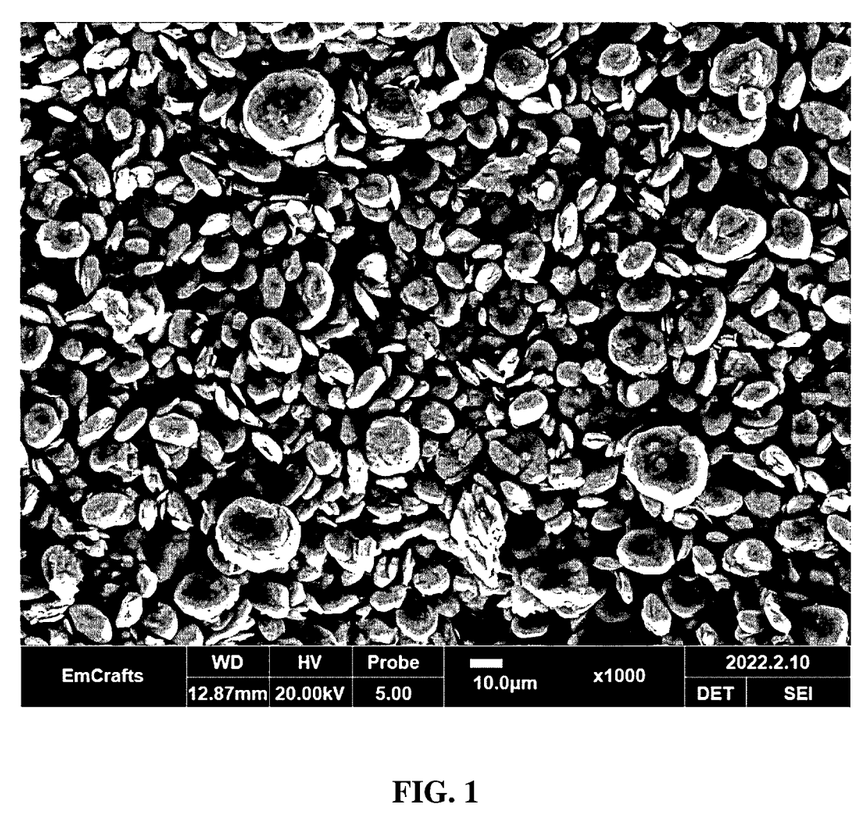
FIG. 1 is an SEM image showing a conglomerated graphite particle aggregate manufactured according to the first embodiment of a method for manufacturing conglomerated graphite of the present invention.
Figure 2:
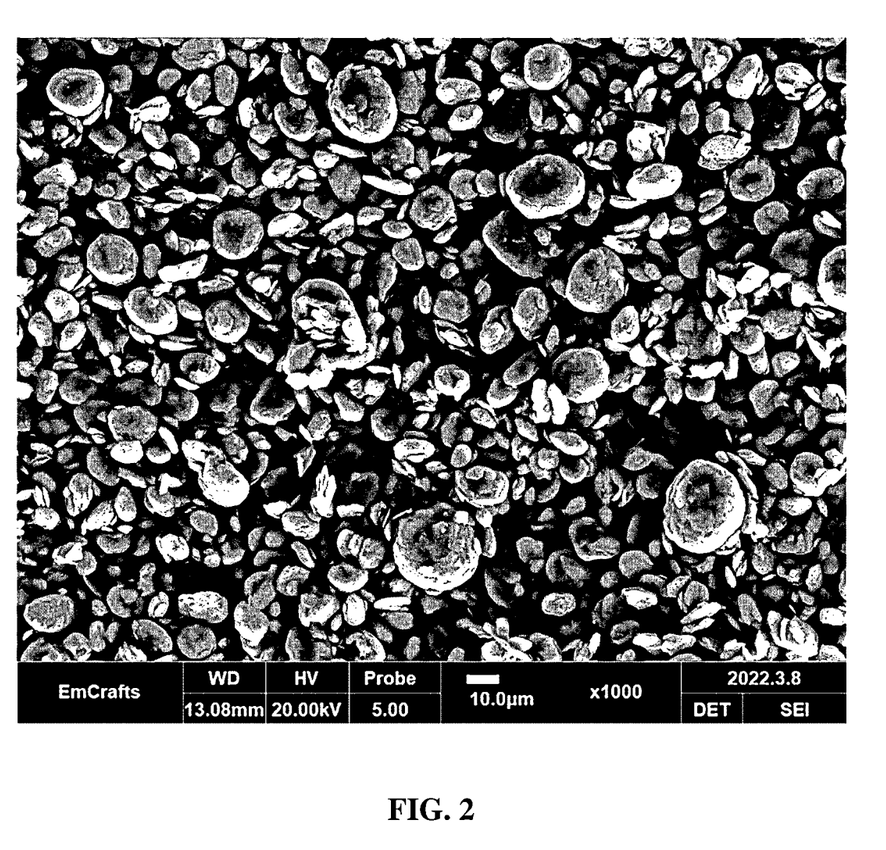
FIG. 2 is an SEM image showing a conglomerated graphite particle aggregate manufactured according to the second embodiment of a method for manufacturing conglomerated graphite of the present invention.

The SEM images of the conglomerated graphite obtained by the method for manufacturing the conglomerated graphite of the present invention including the steps (a) to (f) are shown in FIGS. 1 and 2. As can be seen in the SEM images of FIGS. 1 and 2, the conglomerated graphite obtained by the manufacturing method of the present invention exhibit a spheroidal shape.

Figure 5:
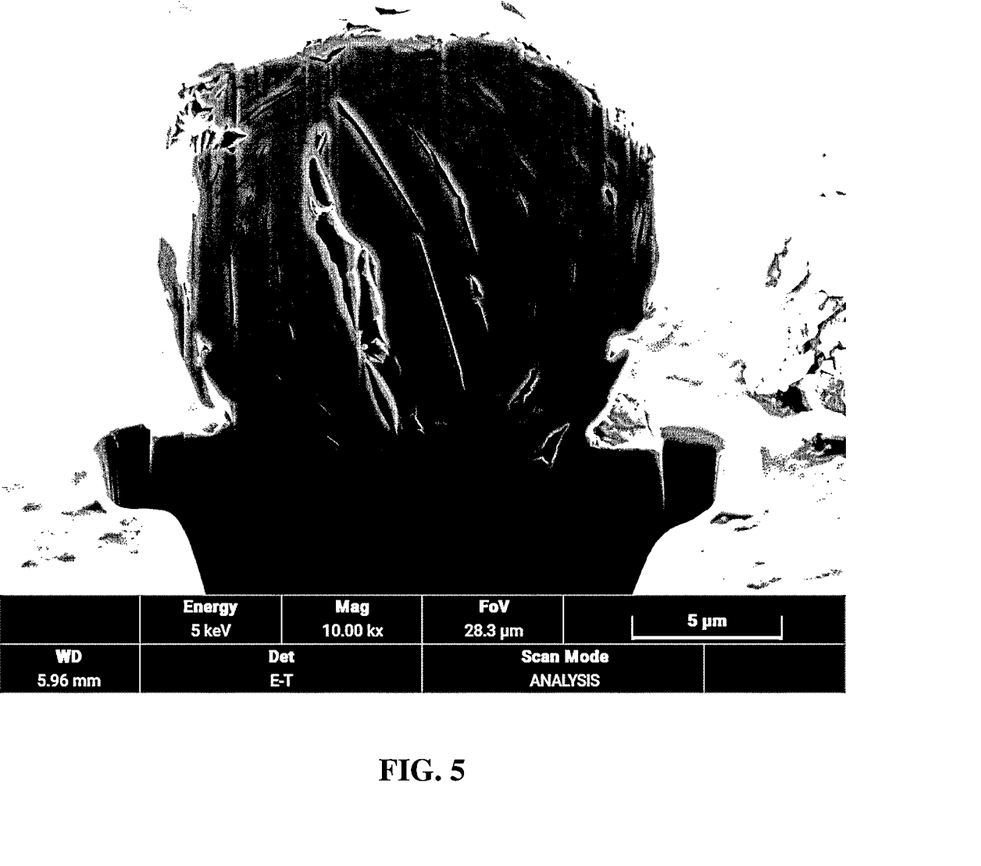
FIG. 5 is an FIB image showing a conglomerated graphite particle manufactured according to the first embodiment of a method for manufacturing conglomerated graphite of the present invention.
Figure 6:
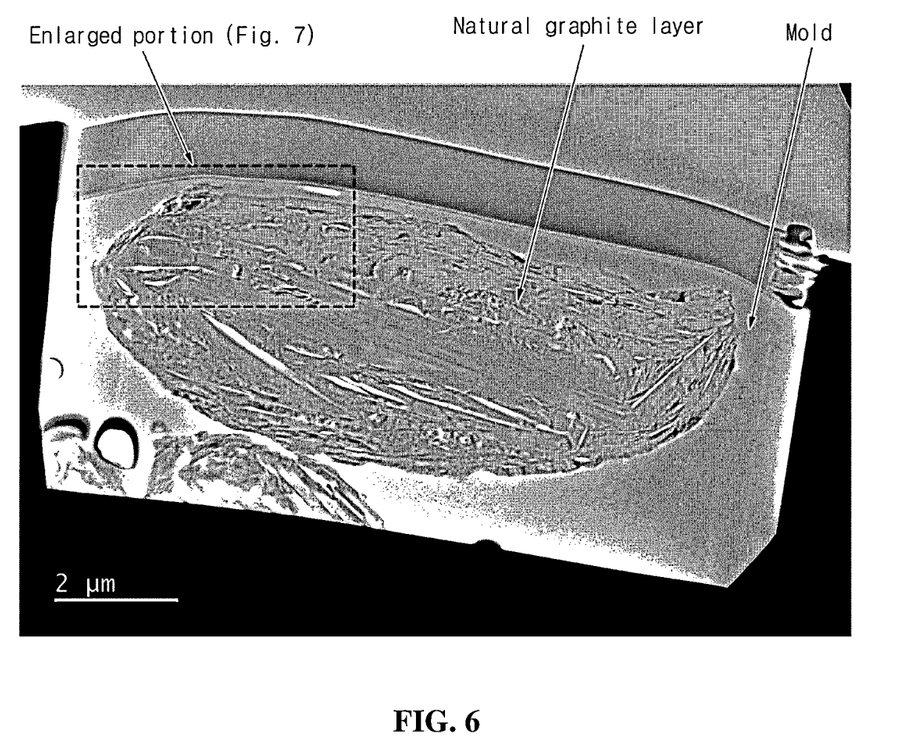
FIG. 6 is a TEM image showing a cross-section of a conglomerated graphite particle manufactured according to the first embodiment of a method for manufacturing conglomerated graphite of the present invention.
Figure 7:
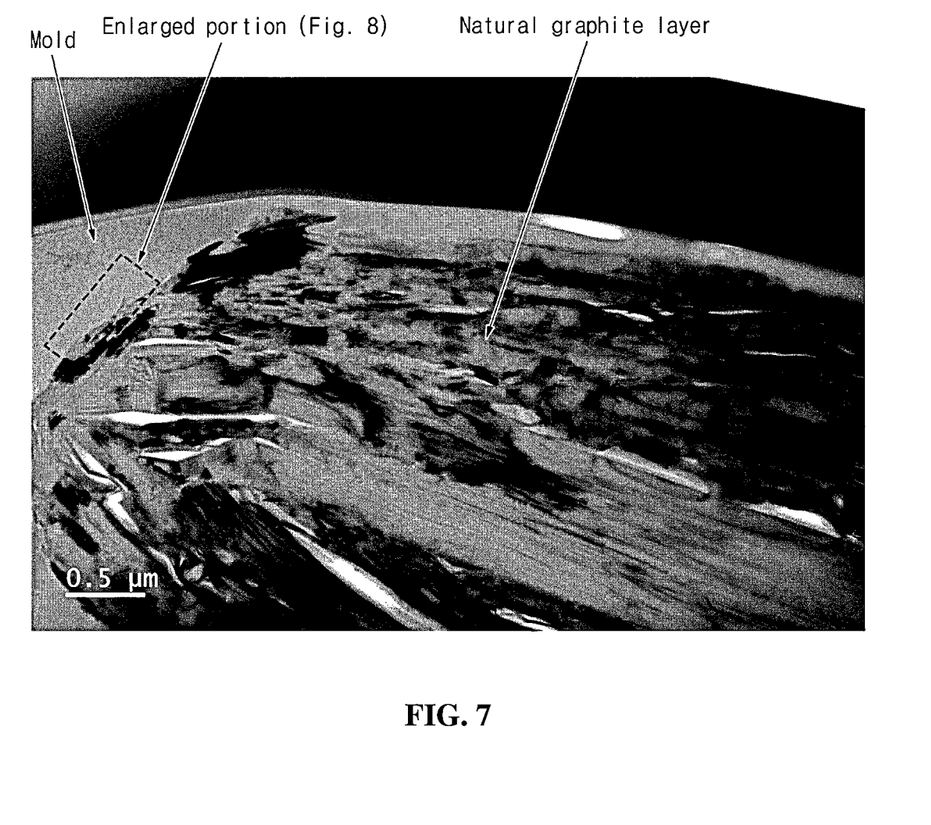
FIG. 7 is an enlarged TEM image showing a portion of the cross-section of the conglomerated graphite particle shown in FIG. 6.

In addition, as shown in FIG. 5, it can be seen that the conglomerated graphite manufactured by the manufacturing method of the present invention has an almost perfect spheroidal shape.

In addition, as shown in FIGS. 6 to 9, it can be seen that the pitch is coated on the outside of the conglomerated graphite manufactured by the manufacturing method of the present invention.

As such, the conglomerated graphite manufactured by the manufacturing method according to the present invention has an almost perfect spheroidal shape, the pitch is formed by coating the outside of the spheroidal shape, and natural graphite is densely formed inside the conglomerated graphite.

The fact that natural graphite is densely formed inside the conglomerated graphite is caused by the use of the binder in the pulverized natural graphite. That is, the pulverized natural graphite is perfectly spheroidized by the binder, which results in the formation of the conglomerated precursor (see the step (b) of the method for manufacturing conglomerated graphite according to the present invention).

As a result of the manufacturing steps, the physical properties of the finally manufactured conglomerated graphite, such as pore volume and pore size, are reduced, resulting in excellent high-power characteristics.

In addition, the formation of the pitch on the outer surface of the conglomerated graphite having an almost perfectly spheroidal shape is the result of treating the conglomerated precursor with an appropriate amount of pitch and a wet method, and thus the physical properties of the finally manufactured conglomerated graphite, such as the D002 value indicating the degree of crystallinity, are reduced. Accordingly, the conglomerated graphite of the present invention has the advantage of being able to be used as an excellent anode material even under the pressure of a battery manufacturing process.

DESCRIPTION OF EMBODIMENTS

Hereinafter, the present invention will be further described through various embodiments. The following embodiments are intended to illustrate or specifically describe the present invention, and the scope of the present invention is not limited thereto.

In addition, since the contents not described herein can be sufficiently inferred by those skilled in the art, the description thereof will be omitted.

First Embodiment

Petroleum-based pitch having an average particle size of 5 mm is pulverized to an average particle size of 4 μm after the pulverization pressure of a jet mill is set to 6 to 8 bar, and flaky natural graphite having an average particle size of 100 μm is pulverized to an average particle size of 3 μm after the pulverization pressure of a jet mill is set to 6 to 8 bar (step (a)).

The pulverized graphite 10 kg and paraffin oil 2 kg are placed in a paddle mixer and mixed for 1 hour. An obtained mixture 6 kg is placed in a conglomerating machine and conglomeration processing is performed for 600 seconds at a linear speed of 4,500 m/min. The conglomeration-processed precursor 6 kg is recovered, then placed in a dryer, and dried at 500° C. for 1 hour to obtain a conglomerated precursor (step (b)).

The obtained conglomerated precursor 5 kg is placed in a Nauta mixer. The pulverized petroleum-based pitch 1.5 kg (corresponding to 30 parts by weight per 100 parts by weight of graphite in the step (a)) is placed in 13.5 kg of THF and dissolved, followed by being placed in the Nauta mixer containing 5 kg of the precursor and stirred for 1 hour. When stirring is completed, THF is distilled and recovered while heating at 130° C. under a vacuum of 40 mbar, and dry mixing is performed to obtain a conglomerated graphite composite. The conglomerated graphite composite obtained when the dry mixing is completed is subjected to pin milling to pulverize particles (step (c)).

The obtained pulverized conglomerated graphite composite is placed in an electric furnace and heat-treated at 1000° C. in a nitrogen atmosphere to obtain conglomerated graphite. The heat-treatment time at 1000° C. is set to 1 hour (step (d)).

After the 1000° C. heat-treatment is completed, the first heat-treated conglomerated graphite is placed back into the electric furnace and subjected to the second heat-treatment at 2400° C. for 1 hour in an argon gas atmosphere (step (e)).

The conglomerated graphite that has completed the second heat-treatment at 2400° C. is classified through a 325 Mesh sieve classifier and thereby an anode material of the conglomerated graphite is finally manufactured (step (f)).

For the conglomerated graphite finally manufactured through the steps (a) to (f), an average particle diameter (D50, μm), a specific surface area (m$^2$/g), a graphite interlayer distance (d002, Å) through XRD analysis, a pore volume, and a pore size were measured. In addition, a coin cell half-cell using the conglomerated graphite as an anode active material was manufactured, and the initial discharge capacity (0.2 C discharge capacity, mAh/g), initial efficiency (%), 3 C discharge capacity (mAh/g), and high-rate charging/discharging characteristics (high-power characteristics, 3 C/0.2 C, %) of the battery were measured (see Tables 1 and 2).

Second Embodiment

The final conglomerated graphite was manufactured in the same manner as in the first embodiment, except that the 'second heat-treatment temperature of the step (e)' of the first embodiment was set to "2,600° C.".

For the conglomerated graphite finally manufactured through the steps (a) to (f), an average particle diameter (D50, μm), a specific surface area (m$^2$/g), a graphite interlayer distance (d002, Å) through XRD analysis, a pore volume, and a pore size were measured. In addition, a coin cell half-cell using the conglomerated graphite as an anode active material was manufactured, and the initial discharge capacity (0.2 C discharge capacity, mAh/g), initial efficiency (%), 3 C discharge capacity (mAh/g), and high-rate charging/discharging characteristics (high-power characteristics, 3 C/0.2 C, %) of the battery were measured (see Tables 1 and 2).

First Comparative Example

The final conglomerated graphite was manufactured in the same manner as in the first embodiment, except that the 'pulverized pitch and THF of the step (c)' of the first embodiment were used by '1.0 kg (corresponding to 20 parts by weight per 100 parts by weight of graphite in the step (a)) and 9.0 kg', respectively.

For the conglomerated graphite finally manufactured through the steps (a) to (f), an average particle diameter (D50, μm), a specific surface area ($m^2$/g), a graphite interlayer distance (d002, Å) through XRD analysis, a pore volume, and a pore size were measured. In addition, a coin cell half-cell using the conglomerated graphite as an anode active material was manufactured, and the initial discharge capacity (0.2 C discharge capacity, mAh/g), initial efficiency (%), 3 C discharge capacity (mAh/g), and high-rate charging/discharging characteristics (high-power characteristics, 3 C/0.2 C, %) of the battery were measured (see Tables 1 and 2).

Second Comparative Example

The final conglomerated graphite was manufactured in the same manner as in the first embodiment, except that the 'pulverized pitch and THE of the step (c)' of the first embodiment were used by '0.5 kg (corresponding to 10 parts by weight per 100 parts by weight of graphite in the step (a)) and 4.5 kg', respectively.

For the conglomerated graphite finally manufactured through the steps (a) to (f), an average particle diameter (D50, μm), a specific surface area ($m^2$/g), a graphite interlayer distance (d002, Å) through XRD analysis, a pore volume, and a pore size were measured. In addition, a coin cell half-cell using the conglomerated graphite as an anode active material was manufactured, and the initial discharge capacity (0.2 C discharge capacity, mAh/g), initial efficiency (%), 3 C discharge capacity (mAh/g), and high-rate charging/discharging characteristics (high-power characteristics, 3 C/0.2 C, %) of the battery were measured (see Tables 1 and 2).

Third Comparative Example

The final conglomerated graphite was manufactured in the same manner as in the first embodiment, except that the 'second heat-treatment temperature of the step (e)' of the first embodiment was set to "2,000° C.".

For the conglomerated graphite finally manufactured through the steps (a) to (f), an average particle diameter (D50, μm), a specific surface area ($m^2$/g), a graphite interlayer distance (d002, Å) through XRD analysis, a pore volume, and a pore size were measured. In addition, a coin cell half-cell using the conglomerated graphite as an anode active material was manufactured, and the initial discharge capacity (0.2 C discharge capacity, mAh/g), initial efficiency (%), 3 C discharge capacity (mAh/g), and high-rate charging/discharging characteristics (high-power characteristics, 3 C/0.2 C, %) of the battery were measured (see Tables 1 and 2).

Fourth Comparative Example

The final conglomerated graphite was manufactured in the same manner as in the first embodiment, except that the 'second heat-treatment' which is the step (e) of the first embodiment was not performed.

For the conglomerated graphite finally manufactured through the steps (a) to (f), an average particle diameter (D50, μm), a specific surface area ($m^2$/g), a graphite interlayer distance (d002, Å) through XRD analysis, a pore volume, and a pore size were measured. In addition, a coin cell half-cell using the conglomerated graphite as an anode active material was manufactured, and the initial discharge capacity (0.2 C discharge capacity, mAh/g), initial efficiency (%), 3 C discharge capacity (mAh/g), and high-rate charging/discharging characteristics (high-power characteristics, 3 C/0.2 C, %) of the battery were measured (see Tables 1 and 2).

Fifth Comparative Example

The final conglomerated graphite was manufactured in the same manner as in the first embodiment, except that the 'pulverized pitch and THE of the step (c)' of the first embodiment were used by '2.0 kg (corresponding to 40 parts by weight per 100 parts by weight of graphite in the step (a)) and 18.0 kg', respectively. Also, due to this amount of pitch used, a hard lump was formed after the step (c), and as a result, the first heat-treatment step (d), the second heat-treatment step (e), and the classification step (f) could not be performed.

For the conglomerated graphite finally manufactured through the steps (a) to (f), an average particle diameter (D50, μm), a specific surface area ($m^2$/g), a graphite interlayer distance (d002, Å) through XRD analysis, a pore volume, and a pore size were measured. In addition, a coin cell half-cell using the conglomerated graphite as an anode active material was manufactured, and the initial discharge capacity (0.2 C discharge capacity, mAh/g), initial efficiency (%), 3 C discharge capacity (mAh/g), and high-rate charging/discharging characteristics (high-power characteristics, 3 C/0.2 C, %) of the battery were measured (see Tables 1 and 2).

Sixth Comparative Example

The final conglomerated graphite was manufactured in the same manner as in the first embodiment, except that 'THF as a solvent was not used (dry treatment due to non-use of solvent)' in the 'conglomerated graphite composite preparing step of the step (c)' of the first embodiment.

For the conglomerated graphite finally manufactured through the steps (a) to (f), an average particle diameter (D50, μm), a specific surface area ($m^2$/g), a graphite interlayer distance (d002, A) through XRD analysis, a pore volume, and a pore size were measured. In addition, a coin cell half-cell using the conglomerated graphite as an anode active material was manufactured, and the initial discharge capacity (0.2 C discharge capacity, mAh/g), initial efficiency (%), 3 C discharge capacity (mAh/g), and high-rate charging/discharging characteristics (high-power characteristics, 3 C/0.2 C, %) of the battery were measured (see Tables 1 and 2).

Seventh Comparative Example

Using pulverized pitch and THE by '0.5 kg (corresponding to 10 parts by weight per 100 parts by weight of graphite) and 4.5 kg', respectively, for 5 kg of spheroidal graphite (natural spheroidal graphite from Weida, China, with an average particle size D50 of 12.7 um and a specific surface area of 6.6 m$^2$/g), the steps (c) to (f) of the first embodiment were performed in the same manner to manufacture the final conglomerated graphite anode material.

For the conglomerated graphite finally manufactured through the steps (a) to (f), an average particle diameter (D50, μm), a specific surface area (m$^2$/g), a graphite interlayer distance (d002, Å) through XRD analysis, a pore volume, and a pore size were measured. In addition, a coin cell half-cell using the conglomerated graphite as an anode active material was manufactured, and the initial discharge capacity (0.2 C discharge capacity, mAh/g), initial efficiency (%), 3 C discharge capacity (mAh/g), and high-rate charging/discharging characteristics (high-power characteristics, 3 C/0.2 C, %) of the battery were measured (see Tables 1 and 2).

Table 1 below shows the process conditions of the first and second embodiments and the first to seventh comparative examples. Table 2 below shows the average particle size (D50, μm), specific surface area (m$^2$/g), graphite interlayer distance (d002, Å) through XRD analysis, pore volume, and pore size of the conglomerated graphite manufactured under the process conditions of Table 1.

For the average particle size (D50), the particle size was measured using Anton Paar's Particle Size Analyzer, and the specific surface area (m$^2$/g) was measured using Micromeritics' BET device.

In addition, d002 (Å) of the graphite interlayer distance was measured as a stacking distance of each carbon hexagonal mesh face through XRD analysis, and the calculation is as follows.

dried in a vacuum oven at 110° C. for about 12 hours to prepare an anode electrode plate.

Using the prepared anode electrode plate; a lithium foil as a counter electrode; a separator of porous polypropylene film; and a liquid electrolyte in which LiPF$_6$ is dissolved at a concentration of 1.2 M in a solvent in which ethylene carbonate and diethyl carbonate (DEC) are mixed at a volume ratio of 3:7, a CR2032 coin type half-cell was prepared.

<Measurement of Initial Discharge Capacity (mAh/g) and Initial Efficiency (%) of Coin Cell>

A constant current was applied until the battery voltage reached 0.01V (vs. Li) with a current of 0.1 C rate at 25° C. When the battery voltage reached 0.01V, a constant voltage was applied for charging until the current reached a 0.01 C rate. Discharging was made with a constant current of 0.2 C rate until the voltage reached 1.5V (vs. Li).

<Measurement of High-power Characteristics of Coin Cell>

The discharging rate for high-power characteristics was expressed as a relative value by measuring the battery discharge capacity under the conditions of 3 C and 0.2 C.

Table 1 below shows the input amounts of spheroidal graphite precursor raw materials of natural graphite and binder, the input amounts of pitch and solvent for the surface treatment process, and the first and second heat-treatment temperature in case of the first and second embodiments and the first to seventh comparative examples.

TABLE 1

| | Spheroidal graphite precursor raw material input amount (kg) | Surface treatment process | Heat treatment temperature (first → second) |
|---|---|---|---|
| 1$^{st}$ Embodiment | Natural graphite: 100 Binder: 20 | Wet surface treatment (pitch: 30, solvent: 270) | 1000° C. → 2400° C. |
| 2$^{nd}$ Embodiment | Natural graphite: 100 Binder: 20 | Wet surface treatment (pitch: 30, solvent: 270) | 1000° C. → 2600° C. |
| 1$^{st}$ Comp. Ex. | Natural graphite: 100 Binder: 20 | Wet surface treatment (pitch: 20, solvent: 270) | 1000° C. → 2400° C. |
| 2$^{nd}$ Comp. Ex. | Natural graphite: 100 Binder: 20 | Wet surface treatment (pitch: 10, solvent: 270) | 1000° C. → 2400° C. |
| 3$^{rd}$ Comp. Ex. | Natural graphite: 100 Binder: 20 | Wet surface treatment (pitch: 30, solvent: 270) | 1000° C. → 2000° C. |
| 4$^{th}$ Comp. Ex. | Natural graphite: 100 Binder: 20 | Wet surface treatment (pitch: 30, solvent: 270) | 1000° C. |
| 5$^{th}$ Comp. Ex. | Natural graphite: 100 Binder: 20 | Wet surface treatment (pitch: 40, solvent: 360) | Note 1 |
| 6$^{th}$ Comp. Ex. | Natural graphite: 100 Binder: 20 | Dry surface treatment (pitch: 30) | 1000° C. → Note 2 |
| 7$^{th}$ Comp. Ex. | Spheroidal graphite: 100 | Wet surface treatment (pitch: 10) | 1000° C. → 2400° C. |

*Note 1:
After the surface treatment process, it is discharged as a hard lump, so it cannot be subjected to additional heat treatment (see FIG. 3)
**Note 2:
After the 1,000° C. heat treatment, it is discharged as a hard lump, so it cannot be subjected to second heat treatment (see FIG. 4)

d002=λ/2(sin θ), λ: wavelength value of Cu, the target of X-rays (1.5406 A)

θ: typical 002 in graphite is 26.554 2θ

<Manufacture of Coin Cell>

A slurry was prepared by mixing the conglomerated graphite anode active material in each of the first and second embodiments and the first to seventh comparative examples: SBR:CMC in ultrapure water at a ratio of 97:1.5:1.5. The slurry was uniformly coated on copper foil, dried in an oven at 80° C. for about 2 hours, then roll-pressed, and further Table 1 shows the process conditions of the first and second embodiments and the first to seventh comparative examples regarding the method for manufacturing the conglomerated graphite of the present invention including the steps (a) to (f) described above.

Specifically, in the first and second embodiments of the present invention, the content of the pitch for the surface treatment process is 30 parts by weight per 100 parts by weight of natural graphite in the spheroidal graphite precursor of natural graphite and binder, and in the first, second and fifth comparative examples, the content is 20 parts by weight, 10 parts by weight, and 40 parts by weight, respectively. The pitch usage amounts of the first, second and fifth comparative examples are outside the range of 25 parts by weight to 35 parts by weight per 100 parts by weight of natural graphite, which is the pitch usage amount of the present invention.

In addition, the second heat-treatment temperature of the third comparative example is set to 2,000° C., which is outside "2,100° C. to 2,700° C." that is the range of the second heat-treatment temperature of the present invention. Also, in the fourth comparative example 4, only the first heat-treatment is performed and the second heat-treatment is omitted.

In the sixth comparative example, the surface treatment of the spheroidal graphite precursor uses a dry surface treatment process, that is, uses only pitch without using a solvent, and in the seventh comparative example 7, a wet surface treatment of the surface of spheroidal graphite is used.

The results obtained by the manufacturing methods of the first and second embodiments and the fourth and fifth comparative examples are shown in FIGS. 1 to 4.

As shown in FIGS. 1 and 2, it can be seen that the conglomerated graphite manufactured by the first and second embodiments is particulate conglomerated graphite.

Figure 3:
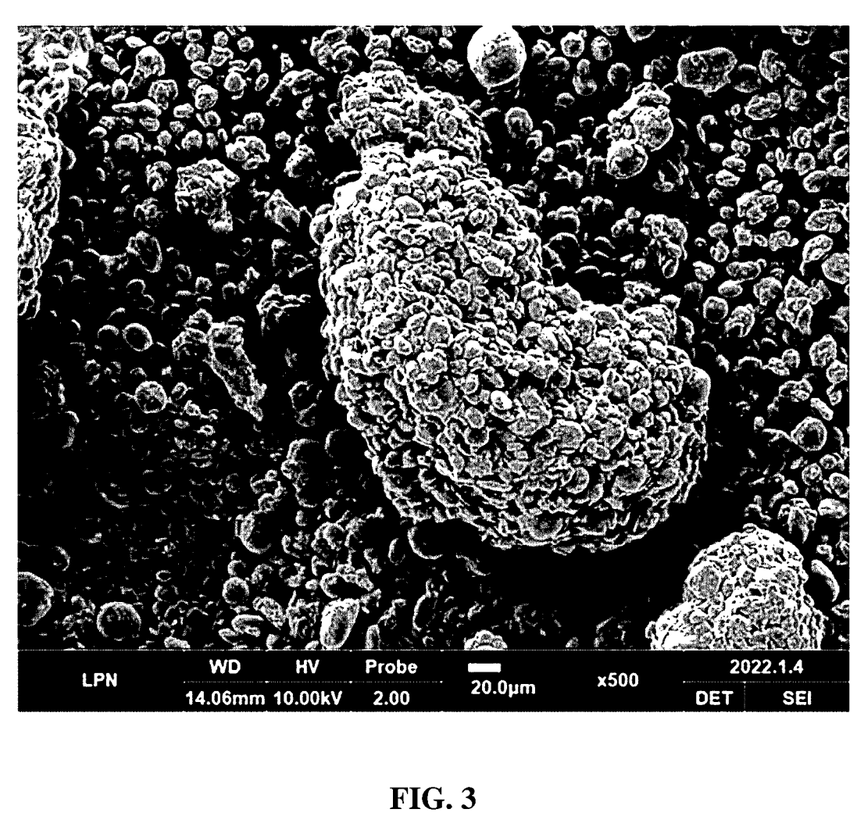
FIG. 3 is an SEM image showing a conglomerated graphite particle aggregate manufactured according to the fifth comparative example of a method for manufacturing conglomerated graphite of the present invention.
Figure 4:
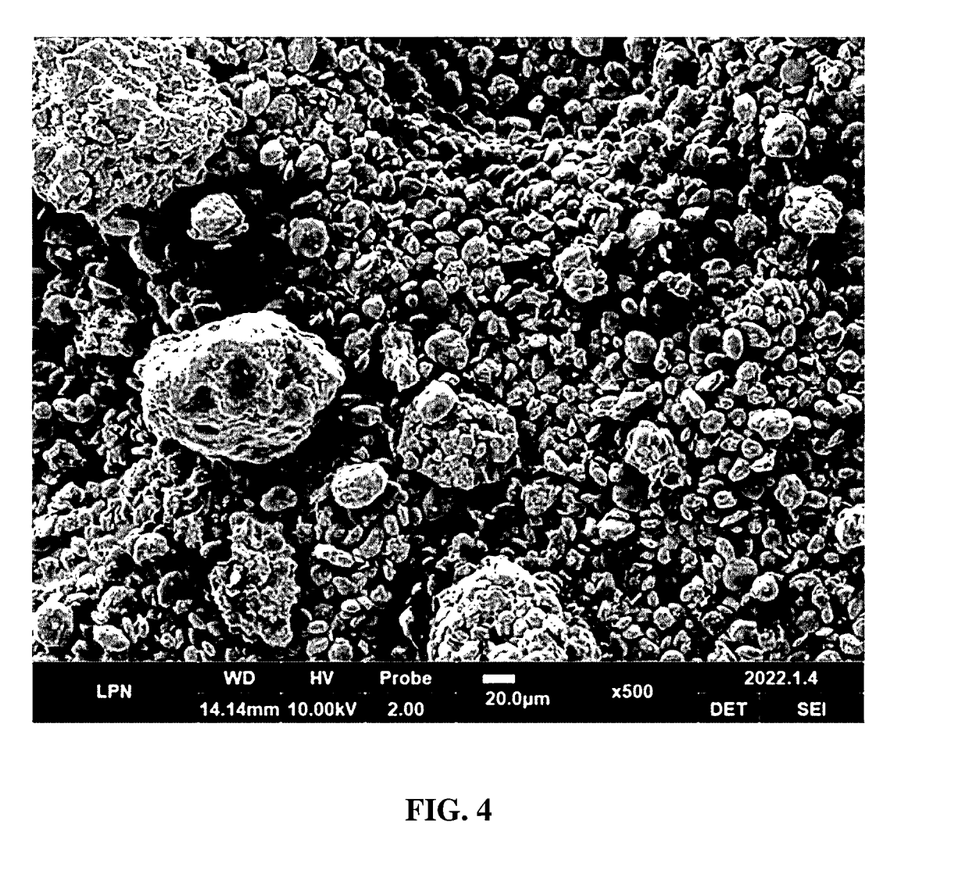
FIG. 4 is an SEM image showing a conglomerated graphite particle aggregate manufactured according to the sixth comparative example of a method for manufacturing conglomerated graphite of the present invention.

However, as shown in FIGS. 3 and 4, in the case where the amount of pitch in the fifth comparative example is excessively used beyond the scope of the present invention, and in the case of dry processing without using a solvent, particulation of conglomerated graphite is not formed, making it almost impossible to use it as an anode material.

In addition, FIGS. 5 to 9 show TEM images of cross-sections and surfaces of the conglomerated graphite particle manufactured by the first embodiment of the present invention.

Figure 8:
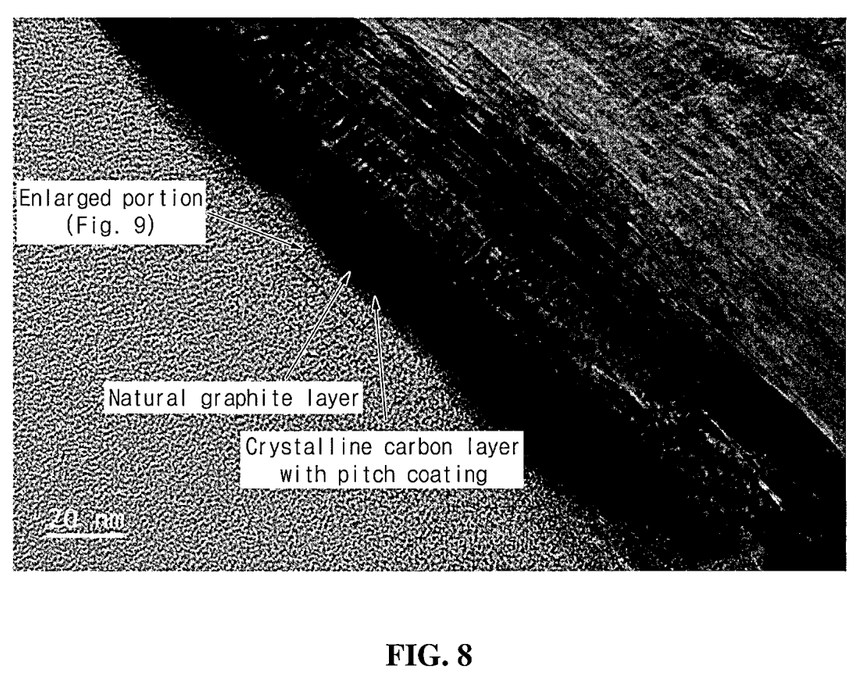
FIG. 8 is a further enlarged TEM image showing a portion of the cross-section of the conglomerated graphite particle shown in FIG. 7.
Figure 9:
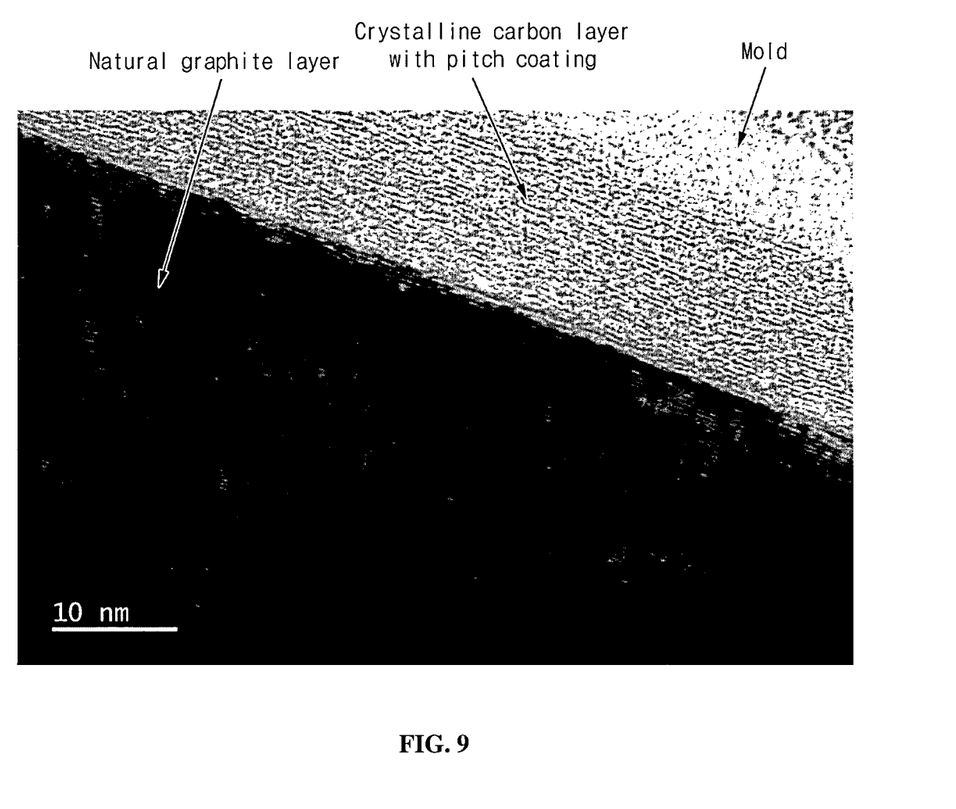
FIG. 9 is a further enlarged TEM image showing a portion of the cross-section of the conglomerated graphite particle shown in FIG. 8.

As shown in FIGS. 5 to 9, it can be seen that the conglomerated graphite manufactured by the manufacturing method of the present invention has an almost perfect spheroidal shape (see FIG. 5), the natural graphite is densely formed inside the conglomerated graphite (see FIGS. 8 and 9), and the pitch is densely formed and coated only on the outside of the spheroidal natural graphite (see FIGS. 8 and 9).

The conglomerated graphite of the present invention shown in FIGS. 5 to 9 is one manufactured with the characteristics of each step of the method for manufacturing the conglomerated graphite of the present invention.

Accordingly, due to the uniqueness shown in FIGS. 5 to 9, that is, the fact that natural graphite is densely formed inside the conglomerated graphite particle and that pitch is formed only on the outside of the spheroidal natural graphite, the conglomerated graphite of the present invention has the advantage of excellent high-power characteristics by reduced pore volume and pore size, which are physical characteristics, and also, since the value of D002 indicating the degree of crystallinity is lowered, the conglomerated graphite of the present invention has the advantage of being able to be used as an excellent anode material even under the pressure of a battery manufacturing process.

Table 2 below shows the physical properties of the pore volume (cc/g), pore size (nm), particle size (D50, μm), specific surface area (m$^2$/g), and d002 (nm, graphite interlayer distance) of the conglomerated graphite manufactured under the process conditions of Table 1 in the first and second embodiments and the first to seventh comparative examples, and also shows the initial discharge capacity (%), initial efficiency (%) and high-rate discharge characteristics (high-power characteristics, %) of a battery using the conglomerated graphite as an anode active material.

TABLE 2

| | Conglomerated graphite | | | | | | | |
|---|---|---|---|---|---|---|---|---|
| | pore volume (cc/g) | pore size (nm) | Particle size (D50, μm) | Specific surface area (m$^2$/g) | d002 (Å) | Initial discharge capacity (%) | Initial efficiency (%) | Power characteristics (high-power characteristics, 3 C/0.2 C, %) |
| 1$^{st}$ Embodiment | 0.0054 | 17.52 | 15.1 | 1.24 | 3.355 | 355 | 345 | 97.2% |
| 2$^{nd}$ Embodiment | 0.0052 | 15.92 | 15.1 | 1.40 | 3.355 | 357 | 346 | 96.9% |
| 1$^{st}$ Comp. Ex. | 0.0145 | 22.66 | 15.3 | 6.74 | 3.355 | 348 | 323 | 92.8% |
| 2$^{nd}$ Comp. Ex. | 0.0255 | 32.35 | 14.9 | 8.01 | 3.358 | 343 | 315 | 91.8% |
| 3$^{rd}$ Comp. Ex. | 0.0064 | 18.10 | 14.8 | 1.44 | 3.365 | 336 | 310 | 92.3% |
| 4$^{th}$ Comp. Ex. | 0.0121 | 18.92 | 14.8 | 2.61 | 3.384 | 349 | 301 | 86.2% |
| 5$^{th}$ Comp. Ex. | — | — | — | — | — | — | — | — |
| 6$^{th}$ Comp. Ex. | — | — | — | — | — | — | — | — |
| 7$^{th}$ Comp. Ex. | 0.01143 | 21.34 | 12.6 | 2.12 | 3.355 | 345 | 223 | 64.6% |

From Table 2, it can be seen that the first and second embodiments regarding the conglomerated graphite manufacturing method of the present invention have a higher initial discharge capacity at 0.2 C and a higher initial discharge capacity at 3 C compared to the first to seventh comparative examples, and thus the power characteristics, which indicate high-power characteristics of the battery, are 97.2% and 96.9%, respectively, which are far superior to 86.2% to 92.8% of the first to sixth comparative examples. In particular, compared to 64.6% of the seventh comparative example, which is a conventional technique in which the surface of the spheroidal graphite is treated with pitch, the present invention shows high-power characteristics that are improved by almost 50% or more.

Therefore, the high 0.2 C and 3 C initial efficiencies of the conglomerated graphite according to the first and second embodiments of the present invention, and the high-power characteristics thereof, indicate that the conglomerated graphite of the first and second embodiments of the present invention can be used as an anode material for batteries in fields requiring the initial high-power, especially, automobiles.

As described above, the method for manufacturing the conglomerated graphite according to the first and second embodiments of the present invention can produce the conglomerated graphite having excellent initial efficiency and high-power characteristics when used as an anode active material of a battery, and the conglomerated graphite having such characteristics can be used as an excellent anode active material of a battery, particularly an automobile battery, and thus has industrial applicability.

INDUSTRIAL APPLICABILITY

Accordingly, the conglomerated graphite of the present invention can be used as an excellent anode active material of a battery, particularly an automobile battery, and thus has industrial applicability. Also, a battery including this has industrial applicability, especially for automobiles.

The invention claimed is:

1. A method for manufacturing conglomerated graphite, comprising:
 (a) a step of pulverizing flaky natural graphite and pitch, respectively ('natural graphite and pitch pulverization step');
 (b) a step of forming a conglomerated precursor by mixing a binder with the pulverized natural graphite of the step (a) ('conglomerated precursor forming step');
 (c) a step of preparing a conglomerated graphite composite by mixing the pulverized pitch of the step (a) and a solvent with the conglomerated precursor formed in the step (b) ('conglomerated graphite composite preparing step');
 (d) a step of first heat-treating the conglomerated graphite composite of the step (c) at 800° C. to 1100° C. ('first heat-treatment step');
 (e) a step of obtaining conglomerated graphite by performing a second heat-treatment at a temperature of 2,100° C. to 2,700° C. after the first heat-treatment of the step (d) ('second heat-treatment step'); and
 (f) a step of obtaining final conglomerated graphite particles by classifying the conglomerated graphite obtained with the second heat-treatment of the step (e) ('classification step') according to an average particle size of the conglomerated graphite,
 wherein in the 'conglomerated graphite composite preparing step' (c), an amount of the pulverized pitch used is 25 parts to 35 parts by weight per 100 parts by weight of the pulverized natural graphite of the step (a), and
 an amount of the solvent used is 100 parts to 400 parts by weight per 100 parts by weight of the pulverized natural graphite of the step (a);
 wherein the step (b) is divided into: i) a pulverized natural graphite and binder mixing step in which a 'binder' is mixed with the pulverized natural graphite' of the step (a); ii) a step of forming the conglomerated precursor from a mixture obtained from the mixing step i); and iii) a step of drying the conglomerated precursor obtained from the conglomerated precursor forming step ii), wherein in the pulverized natural graphite and binder mixing step i), and wherein the conglomerated precursor forming step ii) is a step of putting a mixture of the mixing step i) into a conglomerating machine and then performing conglomeration processing at a linear speed of 3,500 m/min to 6,000 m/min for 100 seconds to 5,000 seconds.

2. The method of claim 1, wherein the step (b) is divided into:
 wherein in the pulverized natural graphite and binder mixing step i), an amount of the binder used is 15 parts to 25 parts by weight per 100 parts by weight of the pulverized natural graphite.

3. The method of claim 1, wherein in the conglomerated graphite particles obtained in the 'classification step' (f), the average particle size is 18 μm or less, and
 a specific surface area of the conglomerated graphite particles is 2.0 m²/g or less.

4. The method of claim 1, wherein in the conglomerated graphite particles obtained in the 'classification step' (f),
 a pore volume inside the conglomerated graphite particles is 0.006 cc/g or less, and
 a pore size inside the conglomerated graphite particles is 18.0 nm or less.

5. The method of claim 1, wherein in the conglomerated graphite particles obtained in the 'classification step' (f), d002 (graphite interlayer distance) indicating a degree of crystallinity of the conglomerated graphite particles is 3.36 Å or less.

6. The method of claim 1, wherein the pitch in the step (b) is 'petroleum-based pitch', 'coal-based pitch', or 'polymer resin', and
 The binder in the step (b) is a 'hydrocarbon oil', a 'silicon oil', a 'vegetable oil', a 'triglyceride', or a mixture thereof.

7. The method of claim 1, wherein in the 'natural graphite and pitch pulverization step' (a),
 particles of the natural graphite having an average particle diameter of 5 μm to 500 μm are pulverized to have an average particle diameter of 1 μm to 10 μm, and
 particles of the pitch having an average particle diameter of 20 mm or less are pulverized to have an average particle diameter of 1 μm to 10 μm.

* * * * *